US012211226B2

(12) United States Patent
Liang et al.

(10) Patent No.: US 12,211,226 B2
(45) Date of Patent: Jan. 28, 2025

(54) METHOD FOR CALCULATING INTERSECTION OVER UNION BETWEEN TARGET REGION AND DESIGNATED REGION IN AN IMAGE AND ELECTRONIC DEVICE USING THE SAME

(71) Applicant: Nanning FuLian FuGui Precision Industrial Co., Ltd., Nanning (CN)

(72) Inventors: Bin-Bin Liang, Nanning (CN); Dong-Ming Li, Shanghai (CN); Ji-Xing Chen, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 421 days.

(21) Appl. No.: 17/718,302

(22) Filed: Apr. 11, 2022

(65) Prior Publication Data

US 2022/0327724 A1    Oct. 13, 2022

(30) Foreign Application Priority Data

Apr. 12, 2021  (CN) .......................... 202110390642.7

(51) Int. Cl.
*G06T 7/62*    (2017.01)
*G06V 10/25*   (2022.01)
(Continued)

(52) U.S. Cl.
CPC ................ *G06T 7/62* (2017.01); *G06V 10/25* (2022.01); *G06V 10/44* (2022.01); *G06V 20/52* (2022.01);
(Continued)

(58) Field of Classification Search
CPC .......... G06T 7/62; G06V 10/25; G06V 10/44; G06V 20/52; G06V 2201/07; G08B 13/194; G08B 13/19613
(Continued)

(56) References Cited

U.S. PATENT DOCUMENTS

2019/0130580 A1*   5/2019   Chen ...................... G06V 10/82

FOREIGN PATENT DOCUMENTS

CN    104933710 B    6/2018
CN    110427908 A    11/2019
(Continued)

OTHER PUBLICATIONS

Title of the article:How to stream videos from my USB webcam to a remote HTML page published date:Oct. 26, 2020.

*Primary Examiner* — Stephen P Coleman
(74) *Attorney, Agent, or Firm* — ScienBiziP, P.C.

(57) ABSTRACT

A method for rapidly calculating intersection over union (IOU) between a target region and a designated region in an image is used in an electronic device. The electronic device detects a target object from an image received from a monitored location, and determines a designated region, a target region, and a combined region from the image, the target region including the target object. The electronic device calculates a first area of the designated region, a second area of the target region, and a third area of the combined region, and calculates a value of IOU according to formula of SIOU=(S1+S2−S3)/S2. S1 represents the first area, S2 represents the second area, and S3 represents the third area. The electronic device issues an intrusion warning in or concerning a monitored region according to a comparison result between the value of IOU and a preset threshold.

20 Claims, 6 Drawing Sheets

(51) Int. Cl.
*G06V 10/44* (2022.01)
*G06V 20/52* (2022.01)
*G08B 13/194* (2006.01)

(52) U.S. Cl.
CPC ........ *G08B 13/194* (2013.01); *G06V 2201/07* (2022.01)

(58) Field of Classification Search
USPC .......................................................... 382/103
See application file for complete search history.

(56) References Cited

FOREIGN PATENT DOCUMENTS

| | | | |
|---|---|---|---|
| CN | 112258668 | A | 1/2021 |
| IN | 109002786 | A | 12/2018 |
| TW | 200538704 | A | 12/2005 |
| TW | 201031886 | A | 9/2010 |

* cited by examiner

METHOD FOR CALCULATING INTERSECTION OVER UNION BETWEEN TARGET REGION AND DESIGNATED REGION IN AN IMAGE AND ELECTRONIC DEVICE USING THE SAME

CROSS-REFERENCE TO RELATED APPLICATIONS

This application claims priority to Chinese Patent Application No. 202110390642.7 filed on Apr. 12, 2021, in China State Intellectual Property Administration, the contents of which are incorporated by reference herein.

FIELD

The subject matter herein generally relates to a field of image processing, and especially relates to a method for calculating intersection over union between target region and designated region in an image, and an electronic device using the method.

BACKGROUND

In video surveillance, it is necessary to monitor a designated region in real time. The entry of a target object into the designated region is determined by calculating intersection over union between a target region including the target object and the designated region. The designated region is framed with an ordinary rectangular ROI (Region Of Interest), which is outside the target region to be detected, and misjudgments easily arise. In addition, a traditional method for calculating the intersection over union obtains the area of an overlapping region by a number vertex coordinates of the overlapping region. The above method is time-consuming and inefficient.

BRIEF DESCRIPTION OF THE DRAWINGS

Implementations of the present disclosure will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. In addition, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

A method is illustrated in the disclosure, the method is applied in one or more electronic devices. The electronic device can automatically perform numerical calculation and/or information processing according to a number of preset or stored instructions. The hardware of the electronic device includes, but is not limited to, a microprocessor, an Application Specific Integrated Circuit (ASIC), a Field Programmable Gate Array (FPGA), a Digital signal processor (DSP), or an embedded equipment, etc.

Figure 1:
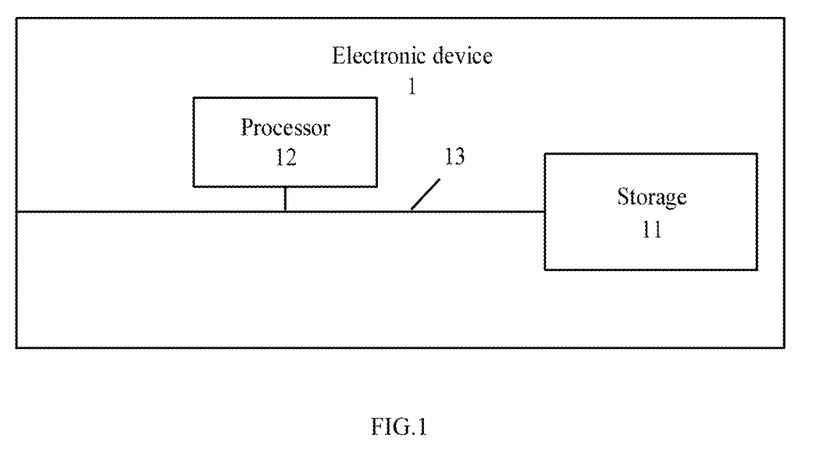
FIG. 1 is a schematic diagram of one embodiment of an electronic device according to the present disclosure.

FIG. 1 illustrates the electronic device. In one embodiment, the electronic device 1 includes, but is not limited to, a storage 11 and at least one processor 12. The storage 11 and the at least one processor 12 can be connected by bus 13 or directly.

In one embodiment, the electronic device 1 can be a computer, a mobile phone, a tablet computer, a personal digital assistant (PDA) and other devices installed with applications. Those skilled in the art can understand that FIG. 1 is only an example of the electronic device 1 and does not constitute a limitation. Another electronic device 1 can include more or fewer components, or combine some components, or different components than as shown in FIG. 1. For example, the electronic device 1 can also include input devices and output devices, network access devices, buses, etc.

Figure 2:
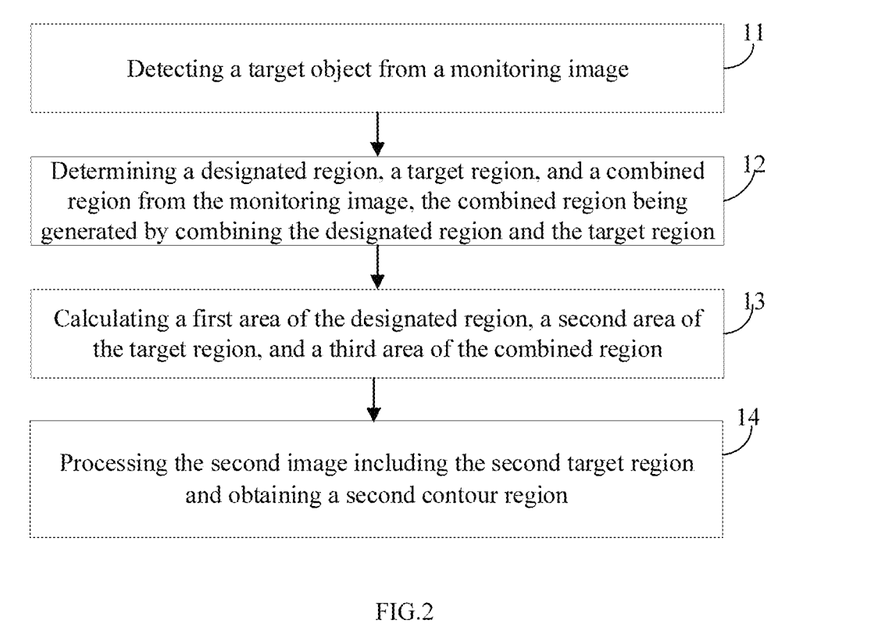
FIG. 2 is a flowchart of one embodiment of a method for calculating intersection over union between target region and designated region in an image.
Figure 3:
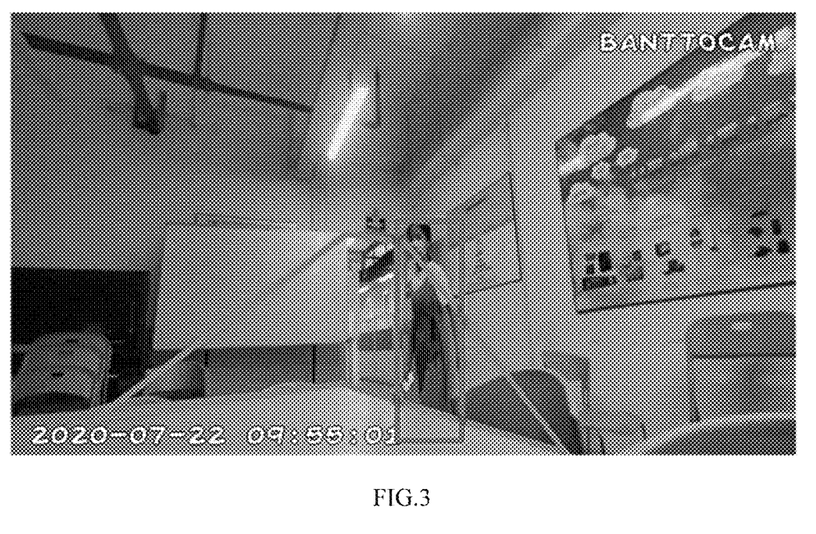
FIG. 3 is a schematic diagram of one embodiment of a region being monitored according to the present disclosure.

FIG. 2 illustrates a method for calculating intersection over union (IOU) between a target region and a designated region in an image. The method is applied in the electronic device 1. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, detecting a target object from a monitoring image.

In one embodiment, in order to obtain the IOU between a designated region and a target region including a target object in the monitoring image, the target object in the monitoring image needs to be isolated and extracted. The target objects can be set according actual needs of the user, for example, the target object can include a human, an animal, an automobile, or any other object.

In one embodiment, detecting the target object in the monitoring image includes:

inputting the monitoring image into a pre-trained target detection model; generating a target candidate frame by the target detection model processing the monitoring image, surrounding the target object in the monitoring image with the target candidate frame, wherein a corresponding area surrounded by the target candidate box is the target region.

In one embodiment, a position of the target candidate frame in the monitoring image can be determined by coordinates of the target candidate frame. Specifically, a first coordinate system (x1oy1) can be established with a lower left corner of the monitoring image placed in forward direction as a center O, a transverse axis of the monitoring image as X1 axis, and a longitudinal axis of the monitoring image as Y1 axis. The position coordinates of the target candidate frame in the monitoring image are determined by the first coordinate system. One of the position coordinates correspond to one pixel in the monitoring image. The position of the target candidate frame in the monitoring image is determined based on four coordinates of the target candidate frame in the monitoring image, which are a first coordinate $A1(x_{min}, y_{min})$, a second coordinate $A2(x_{min}, y_{max})$, a third coordinate $A3(x_{max}, y_{max})$, and a fourth coordinate $A4(x_{max}, y_{min})$. The position of the target candidate frame in the monitoring image is (A1, A2, A3, A4), where, $x_{min}$ refers to the minimum coordinate of the target candidate frame in the X1 axis, $x_{max}$ refers to the maximum coordinate of the target candidate frame in the X1 axis, $y_{min}$ refers to the minimum coordinate of the target candidate frame in the Y1 axis, and $y_{max}$ refers to the maximum coordinate of the target candidate frame in the Y1 axis.

In one embodiment, the target candidate frame is obtained by using the pre-trained target detection model, which can improve a detection accuracy of the target object in the monitoring image.

At block 12, determining a designated region, a target region, and a combined region from the monitoring image, the combined region being generated by combining the designated region and the target region.

In one embodiment, the designated region can be an arbitrary polygon and the designated region can be set according to actual needs of users. In one embodiment, the designated region can be determined by setting vertex coordinates of the designated region. For example, a second coordinate system (X2OY2) is established with a lower left corner of the monitoring image placed in forward direction as the center O, the transverse axis of the monitoring image as the X2 axis and the longitudinal axis monitoring image as the Y2 axis. In the second coordinate system, the vertex coordinates is set as B1(x1,y1), B2(x2, y2), B3(x3,y3), B4(x4,y4), B5(x5,y5).

In one embodiment, an area where the target object is located in the monitoring image is taken as the target region of the monitoring image. The target region includes the target object.

In one embodiment, the designated region is combined with the target region to generate the combined region.

By setting the designated region as an arbitrary polygon, the present disclosure avoids the limitation of the traditional rectangular frame, and makes the arbitrary polygon more in line with actual needs of a monitoring scene.

At block 13, calculating a first area of the designated region, a second area of the target region, and a third area of the combined region.

In one embodiment, in order to obtain an area of the IOU among the designated region, the target region, and the combined region, it is necessary to obtain the area of the specified area, the target object area, and the combined region.

Figure 4:
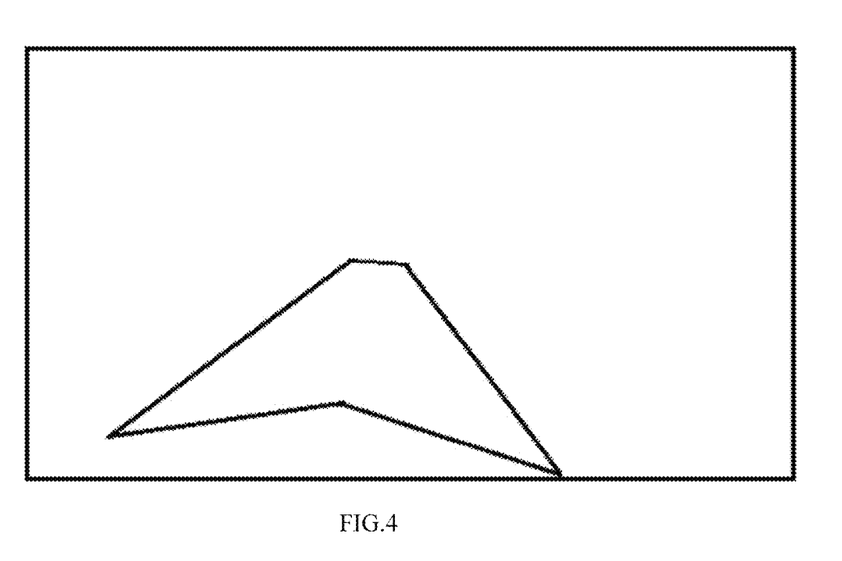
FIG. 4 is a schematic diagram of one embodiment of a first target region in the region of FIG. 3.

In one embodiment, calculating the first area of the designated region includes:

(1) generating a first image having a same size as the monitoring image, wherein the first image can be generated according to the size of the monitoring image, and the first image is a pure color background image;

(2) obtaining first vertex coordinates of the designated region in the monitoring image, wherein the first vertex coordinates of the designated area can be B1(x1,y1), B2(x2, y2), B3(x3,y3), B4(x4,y4), B5(x5,y5);

(3) generating a first target region in the first image according to the first vertex coordinates, wherein a third coordinate system (X3OY3) is established with a lower left corner of the first image placed in forward direction as a center O, and the transverse direction of the first image as a X3 axis and the longitudinal direction of the first image as a Y3 axis, thus the first target region (shown in FIG. 4) in the third coordinate system is generated according to the first vertex coordinates;

(4) processing the first image including the first target region and obtaining a first contour region;

(5) extracting first contour information of the first contour region, wherein the first vertex coordinates are used as the first contour information;

(6) calculating the first area according to the first contour information.

In one embodiment, the first area is calculated according to the first vertex coordinates B1(x1,y1), B2(x2,y2), B3(x3, y3), B4(x4,y4), B5(x5,y5). In one embodiment, the first area is calculated according to formula of $S1 = \frac{1}{2} * \Sigma_{k=1}^{4}(xk*y(k+1) - x(k+1)*yk) + \frac{1}{2}*(x5y1 - x1y5)$ (formula (1)).

In the specific implementation, processing the first image including the first target region and obtaining the first contour region includes: binarizing the first image including the first target region and obtaining a binarized image, performing an edge detection on the binarized image and obtaining an edge image, performing a morphological processing on the edge image and obtaining a morphological image including the first target region, and taking the first target region in the morphological image as the first contour region.

In one embodiment, calculating the second area of the target region includes:

(1) generating a second image having a same size as the monitoring image, wherein the second image can be generated according to the size of the monitoring image, and the second image is a pure color background image;

(2) obtaining the second vertex coordinates of the target region in the monitoring image, wherein the four coordinates obtained in block 11, namely the first coordinate $A1(x_{min}, y_{min})$, the second coordinate $A2(x_{min},$ $y_{max}$), the third coordinate A3($x_{max}$,$y_{max}$), and the fourth coordinate A4($x_{max}$,$y_{min}$), are used as the second vertex coordinates.

Figure 5:
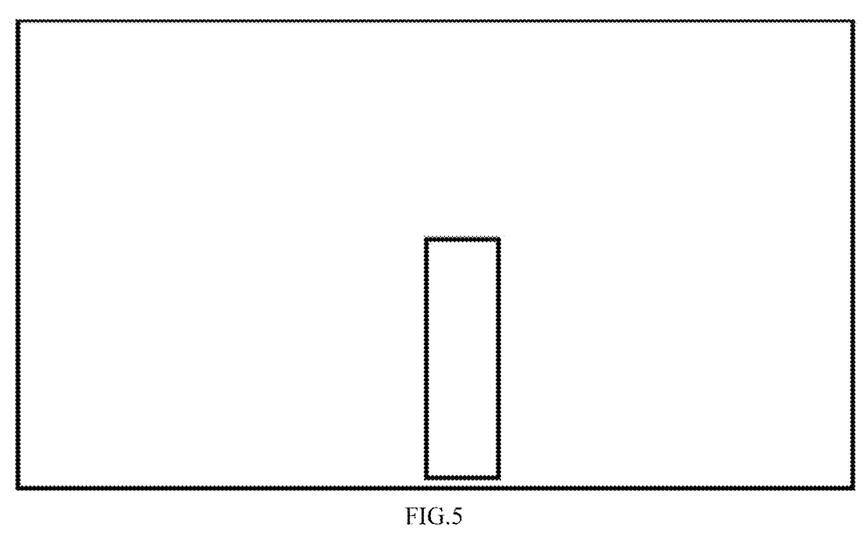
FIG. 5 is a schematic diagram of one embodiment of a second target region in the region of FIG. 3.
Figure 6:
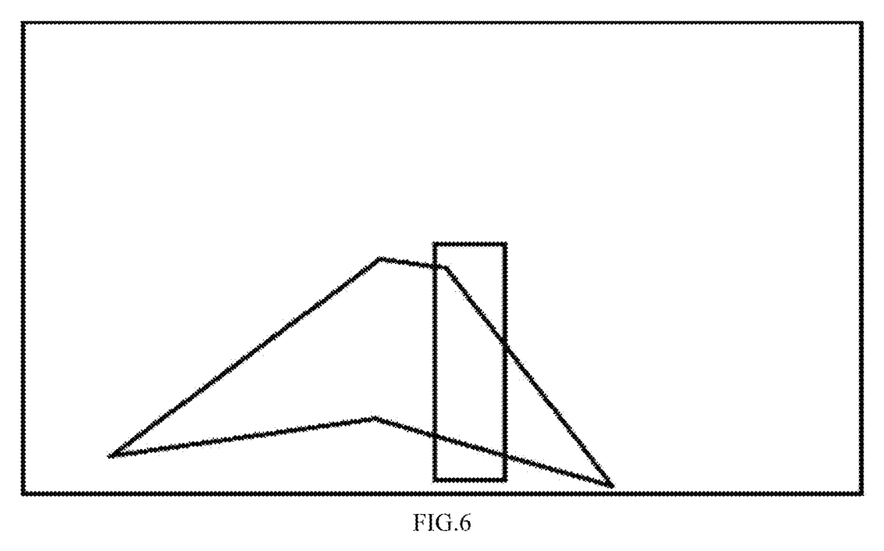
FIG. 6 is a schematic diagram of one embodiment of a third image in the method of FIG. 2 according to the present disclosure.

(3) generating a second target region in the second image according to the second vertex coordinates, wherein a fourth coordinate system (X4OY4) is established with a lower left corner of the second image placed in forward direction as a center O, the transverse direction of the second image as a X4 axis and the longitudinal direction of the second image as a Y4 axis, thus the second target region (shown in FIG. 5) in the fourth coordinate system according to the second vertex coordinates is generated;

(4) processing the second image including the second target region and obtaining a second contour region;

(5) extracting second contour information of the second contour region, wherein the second vertex coordinates are used as the second contour information;

(6) calculating the second area according to the second contour information. In one embodiment, the second area is calculated according to the first coordinate A1($x_{min}$,$y_{minx}$), the second coordinate A2($x_{min}$,$y_{max}$), the third coordinate A3($x_{max}$,$y_{max}$), and the fourth coordinate A4($x_{max}$,$y_{min}$). In one embodiment, the second area is calculated according to formula S2=($y_{max}$-$y_{min}$)*($x_{max}$-$x_{min}$) (formula (2)).

By generating the contour of the designated region in the first image and performing image processing on the first image, and generating the contour of the target region in the second image and performing image processing on the second image, extraction of the contours of the combined region directly by the first image and the second image is rendered easy.

In one embodiment, calculating the third area of the combined region includes:

(1) combining the first image including the first target region and the second image including the second target region and obtaining a third image, wherein an XOR operation on the first image and the second image bit by bit is performed to obtain the third image;

(2) performing image processing on the third image;

(3) extracting the maximum contour region from the processed third image and obtaining a third contour region, wherein all contour regions in the third image can be searched, and the maximum contour region can be filtered from all contour regions of the third image, the maximum contour region can be regarded as the third contour region;

(4) extracting third contour information of the third contour region;

(5) calculating the third area according to the third contour information.

In one embodiment, a fifth coordinate system (X5OY5) can be established with a lower left corner of the third image placed in forward direction as the center O, the transverse direction of the third image as a X5 axis, and the longitudinal direction of the third image as the Y5 axis, thus, third vertex coordinates C1 (x1,Y1), C2 (X2,Y2), . . . , CN (Xn, Yn) of the third contour region in the fifth coordinate system are determined and the third vertex coordinates are regarded as the third contour information. The third area is calculated according to the third vertex coordinates C1 (x1,Y1), C2 (X2,Y2), . . . , CN (Xn, Yn) of the third contour region. In one embodiment, the third area is calculated according to formula S3=½*$\sum_{k=1}^{n-1}$(xk*y(k+1)-x(k+1)*yk)+½*(xny1-x1yn) (formula (3)).

In one embodiment, performing image processing on the third image includes: binarizing the third image and obtaining a binarized image, performing an edge detection on the binarized image and obtaining an edge image, performing a morphological processing on the edge image and obtaining a morphological image.

It should be noted that, instead of directly extracting the combined region from the monitoring image, the combined region is obtained by using the first image and the second image, which removes interference from the monitoring image, delineating the combined region more accurately and clearly.

At block 14, calculating a value of IOU according to formula of $S_{IOU}$=(S1+S2-S3)/S2 (formula (4)), wherein S1 is the first area, S2 is the second area, and S3 is the third area.

In one embodiment, the value of IOU is a proportion of an area of an overlapping part between the designated region and the target region in the target region.

It should be note that, the value of IOU is calculated by mathematical morphology, making the calculation method of the value of IOU simple and speeding up the operation of the calculation in the method.

In one embodiment, the method further includes: determining whether an intrusion warning in the monitoring region in the monitoring image is triggered according to the value of IOU and a preset threshold.

In one embodiment, the monitoring region in the monitoring image can be set according to actual needs of users, for example, the monitoring region can be a library region being monitored.

In one embodiment, the designated region can be set in the monitoring image, and the value of IOU corresponding to the target object can be obtained by using the method for calculating the IOU in the present disclosure. It should be noted that the value of IOU represents the proportion of an area of the target object entering or overlapping the designated region in the area of the target object.

The preset threshold can be set in advance, and the value of IOU compared with the preset threshold. When the value of IOU is greater than the preset threshold, the intrusion warning in the monitored region is triggered and a prompt in the monitored region is generated.

In one embodiment, the larger the value of IOU, the greater the proportion of the target object overlapping the designated region, that is, the greater the probability that a target object has invaded the monitored region.

Referring to FIG. 1, the storage 11 may be an internal memory of the electronic device 1, that is, a memory placed in the electronic device 1. In other embodiments, the storage 11 may also be an external memory of the electronic device 1, that is, a memory external to the electronic device 1.

In one embodiment, the storage 11 is used to store program codes and various data, and realize high-speed and automatic access to programs or data during the operation of the electronic device 1.

In one embodiment, the storage 11 may include a random access memory and a nonvolatile memory, such as hard disk, memory, plug-in hard disk, smart media card (SMC), secure digital (SD) card, flash card, at least one disk storage device, flash device, or other storage device.

In one embodiment, the processor 12 may be a central processing unit (CPU), a general-purpose processor, a digital signal processors (DSP), an application specific integrated circuits (ASIC), a field programmable gate array (FPGA), a programmable logic devices or a transistor logic device, or discrete hardware component, etc. In one embodiment, the processor 12 can be a microprocessor or any conventional processor, etc. The processor 12 is the control center of the electronic device 1, and uses various interfaces and lines to connect various parts of the whole electronic device 1.

It should be noted that if an integrated module/unit of the electronic device 1 is realized in the form of software functional unit and sold or used as an independent product, it can be stored in a computer-readable storage medium. Based on this understanding, the present application realizes all or part of the processes in the methods of the above embodiments, and can also be completed by the instruction of relevant hardware by a computer program. The computer program can be stored in a computer-readable storage medium. When the computer program is executed by the processor, the steps of the above methods and embodiments are carried out. The computer program code can be in the form of source code, object code, executable file, or some intermediate forms. The computer-readable medium may include any entity or device capable of carrying the computer program code, recording medium, U disk, mobile hard disk, magnetic disk, optical disk, computer memory, and read only memory (ROM).

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for calculating intersection over union (IOU) between a target region and a designated region in an image, the method comprising:
    detecting a target object from a monitoring image, the monitoring image being captured by a video surveillance device;
    determining a designated region, a target region, and a combined region from the monitoring image, and the combined region being generated by combining the designated region and the target region, and an area where the target object is located in the monitoring image being taken as the target region;
    calculating a first area of the designated region, a second area of the target region, and a third area of the combined region;
    calculating a value of IOU according to formula of $S_{IOU}=(S1+S2-S3)/S2$, wherein S1 representing the first area, S2 representing the second area and S3 representing the third area; and
    determining an intrusion warning in a monitoring region in the monitoring image according to a comparison result between the value of IOU and a preset threshold.

2. The method as recited in claim 1, wherein calculating the first area of the designated region comprises:
    generating a first image having a same size as the monitoring image;
    obtaining first vertex coordinates of the designated region in the monitoring image;
    generating a first target region in the first image according to the first vertex coordinates;
    processing the first image comprising the first target region and obtaining a first contour region;
    extracting first contour information of the first contour region; and
    calculating the first area according to the first contour information.

3. The method as recited in claim 2, wherein processing the first image comprising the first target region and obtaining the first contour region comprises:
    binarizing the first image comprising the first target region and obtaining a binarized image;
    performing an edge detection on the binarized image and obtaining an edge image;
    performing a morphological processing on the edge image and obtaining a morphological image comprising the first target region; and
    taking the first target region in the morphological image as the first contour region.

4. The method as recited in claim 2, wherein calculating the second area of the target region comprises:
    generating a second image having a same size as the monitoring image;
    obtaining second vertex coordinates of the target region in the monitoring image;
    generating a second target region in the second image according to the second vertex coordinates;
    processing the second image comprising the second target region and obtaining a second contour region;
    extracting second contour information of the second contour region; and
    calculating the second area according to the second contour information.

5. The method as recited in claim 2, wherein calculating the third area of the combined region comprises:
    combining the first image comprising the first target region and the second image comprising the second target region, and obtaining the third image;
    performing an image processing on the third image and extracting a maximum contour region from the third image, and obtaining a third contour region;
    extracting third contour information of the third contour region; and
    calculating the third area according to the third contour information.

6. The method as recited in claim 1, wherein detecting a target object from a monitoring image comprises:
    inputting the monitoring image into a pre-trained target detection model;
    generating a target candidate frame by using the pre-trained target detection model to process the monitoring image; and
    surrounding the target object in the monitoring image by the target candidate frame, wherein a corresponding area surrounded by the target candidate box is the target region.

7. The method as recited in claim 1, wherein determining the intrusion warning in the monitoring region in the monitoring image according to the comparison result between the value of IOU and a preset threshold comprises:
    determining whether the value of IOU is greater than the preset threshold; and
    in response that the value of IOU is greater than the preset threshold, triggering the intrusion warning in the monitoring region.

8. An electronic device for video surveillance comprising:
    a processor; and
    a non-transitory storage medium coupled to the processor and configured to store a plurality of instructions, which cause the processor to:

detect a target object from a monitoring image, the monitoring image being captured by a camera of the electronic device;

determine a designated region, a target region, and a combined region from the monitoring image, wherein the combined region is generated by combining the designated region and the target region, and an area where the target object is located in the monitoring image is taken as the target region;

calculate a first area of the designated region, a second area of the target region, and a third area of the combined region;

calculate a value of IOU according to formula of $S_{IOU}=(S1+S2-S3)/S2$, wherein S1 represents the first area, S2 represents the second area and S3 represents the third area; and determine an intrusion warning in a monitoring region in the monitoring image according to a comparison result between the value of IOU and a preset threshold.

9. The electronic device as recited in claim 8, wherein the plurality of instructions are further configured to cause the processor to:

generate a first image having a same size as the monitoring image;

obtain first vertex coordinates of the designated region in the monitoring image;

generate a first target region in the first image according to the first vertex coordinates;

process the first image comprising the first target region and obtain a first contour region;

extract first contour information of the first contour region; and calculate the first area according to the first contour information.

10. The electronic device as recited in claim 9, wherein the plurality of instructions are further configured to cause the processor to:

binarize the first image comprising the first target region and obtain a binarized image;

perform an edge detection on the binarized image and obtain an edge image;

perform a morphological processing on the edge image and obtain a morphological image comprising the first target region; and take the first target region in the morphological image as the first contour region.

11. The electronic device as recited in claim 9, wherein the plurality of instructions are further configured to cause the processor to:

generate a second image having a same size as the monitoring image;

obtain second vertex coordinates of the target region in the monitoring image;

generate a second target region in the second image according to the second vertex coordinates;

process the second image comprising the second target region and obtain a second contour region;

extract second contour information of the second contour region; and calculate the second area according to the second contour information.

12. The electronic device as recited in claim 9, wherein the plurality of instructions are further configured to cause the processor to:

combine the first image comprising the first target region and the second image comprising the second target region and obtain the third image;

perform image processing on the third image and extract a maximum contour region from the third image and obtaining a third contour region;

extract third contour information of the third contour region; and calculate the third area according to the third contour information.

13. The electronic device as recited in claim 8, wherein the plurality of instructions are further configured to cause the processor to:

input the monitoring image into a pre-trained target detection model;

generate a target candidate frame by using the pre-trained target detection model to process the monitoring image; and surround the target object in the monitoring image by the target candidate frame, wherein a corresponding area surrounded by the target candidate box is the target region.

14. The electronic device as recited in claim 8, wherein the plurality of instructions are further configured to cause the processor to:

determine whether the value of IOU is greater than the preset threshold; and in response that the value of IOU is greater than the preset threshold, the intrusion warning in the monitoring region is triggered.

15. A non-transitory storage medium having stored thereon instructions that, in response that executed by at least one processor of an electronic device for video surveillance, causes the least one processor to execute instructions of a method for calculating intersection over union (IOU) between a target region and a designated region in an image, the method comprising:

detecting a target object from a monitoring image, the monitoring image being captured by a camera of the electronic device;

determining a designated region, a target region, and a combined region from the monitoring image, and the combined region being generated by combining the designated region and the target region, and an area where the target object is located in the monitoring image being taken as the target region;

calculating a first area of the designated region, a second area of the target region, and a third area of the combined region;

calculating a value of IOU according to formula of $S_{IOU}=(S1+S2-S3)/S2$, wherein S1 representing the first area, S2 representing the second area and S3 representing the third area; and determining an intrusion warning in a monitoring region in the monitoring image according to a comparison result between the value of IOU and a preset threshold.

16. The non-transitory storage medium as recited in claim 15, wherein calculating the first area of the designated region comprises:

generating a first image having a same size as the monitoring image;

obtaining first vertex coordinates of the designated region in the monitoring image;

generating a first target region in the first image according to the first vertex coordinates;

processing the first image comprising the first target region and obtaining a first contour region;

extracting first contour information of the first contour region; and calculating the first area according to the first contour information.

17. The non-transitory storage medium as recited in claim 16, wherein processing the first image comprising the first target region and obtaining the first contour region comprises:

binarizing the first image comprising the first target region and obtaining a binarized image;

performing an edge detection on the binarized image and obtaining an edge image;

performing a morphological processing on the edge image and obtaining a morphological image comprising the first target region; and taking the first target region in the morphological image as the first contour region.

18. The non-transitory storage medium as recited in claim 15, wherein calculating the second area of the target region comprises:

generating a second image having a same size as the monitoring image;

obtaining second vertex coordinates of the target region in the monitoring image;

generating a second target region in the second image according to the second vertex coordinates;

processing the second image comprising the second target region and obtaining a second contour region;

extracting second contour information of the second contour region; and calculating the second area according to the second contour information.

19. The non-transitory storage medium as recited in claim 15, wherein calculating the third area of the combined region comprises:

combining the first image comprising the first target region and the second image comprising the second target region and obtaining the third image;

performing image processing on the third image and extracting a maximum contour region from the third image and obtaining a third contour region;

extracting third contour information of the third contour region; and calculating the third area according to the third contour information.

20. The non-transitory storage medium as recited in claim 15, wherein detecting a target object from a monitoring image comprises:

inputting the monitoring image into a pre-trained target detection model;

generating a target candidate frame by using the pre-trained target detection model to process the monitoring image; and surrounding the target object in the monitoring image by the target candidate frame, wherein a corresponding area surrounded by the target candidate box is the target region.

* * * * *